(12) United States Patent  (10) Patent No.: US 8,262,185 B2
Komano et al.  (45) Date of Patent: Sep. 11, 2012

(54) RECORDING APPARATUS AND PROCESSING METHOD EXECUTED BY THE RECORDING APPARATUS

(75) Inventors: Yusuke Komano, Yokohama (JP); Hideki Nakanishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 152 days.

(21) Appl. No.: 12/848,868

(22) Filed: Aug. 2, 2010

(65) Prior Publication Data

US 2011/0032292 A1 Feb. 10, 2011

(30) Foreign Application Priority Data

Aug. 5, 2009 (JP) ................................. 2009-182887

(51) Int. Cl.
*B41J 2/205* (2006.01)
(52) U.S. Cl. ......................................................... 347/15
(58) Field of Classification Search ................ 347/9–11, 347/14, 15, 19
See application file for complete search history.

(56) References Cited

U.S. PATENT DOCUMENTS

| | | | |
|---|---|---|---|
| 4,595,956 A | 6/1986 | Kawamura | |
| 5,060,168 A | 10/1991 | Jingu | |
| 6,203,133 B1 | 3/2001 | Tanaka | |
| 7,385,730 B2 * | 6/2008 | Ogasahara et al. | .......... 358/3.01 |
| 2002/0021319 A1 | 2/2002 | Kawatoko | |
| 2007/0091134 A1 | 4/2007 | Kakutani | |

FOREIGN PATENT DOCUMENTS

| | | |
|---|---|---|
| EP | 1059803 A2 | 12/2000 |
| JP | 9-046522 A | 2/1997 |

* cited by examiner

*Primary Examiner* — An Do

(74) *Attorney, Agent, or Firm* — Canon U.S.A., Inc., IP Division

(57) ABSTRACT

A recording apparatus configured to cause a recording head to move and scan in a reciprocating manner includes a buffer configured to store raster data including multivalued data, a table in which a plurality of dot patterns is defined for a value of the multivalued data and including a dot pattern corresponding to the value, a first information storage unit configured to store an initial value of the dot pattern according to a direction of scanning by the recording head and the value of the multivalued data, a second information storage unit configured to store information indicating an empty raster, and a generation unit configured to, based on the initial value stored by the first information storage unit and the table, read the multivalued data from the buffer and generate a dot pattern based on the read multivalued data.

8 Claims, 13 Drawing Sheets

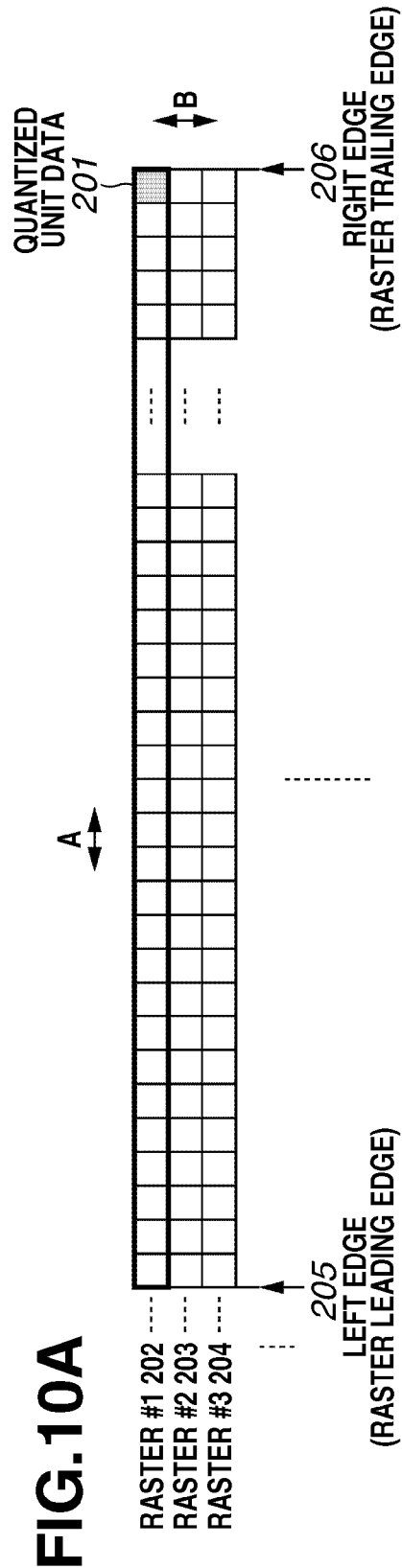
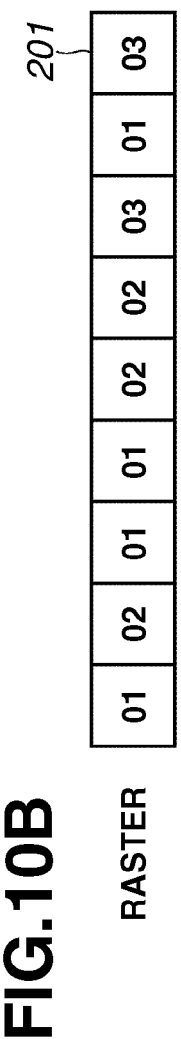

FIG.11

|  | PATTERN 1 | PATTERN 2 | PATTERN 3 | PATTERN 4 |
|---|---|---|---|---|
| LEVEL 00 | | | | |
| LEVEL 01 | | | | |
| LEVEL 02 | | | | |
| LEVEL 03 | | | | |
| ⋮ | ⋮ | ⋮ | ⋮ | ⋮ |

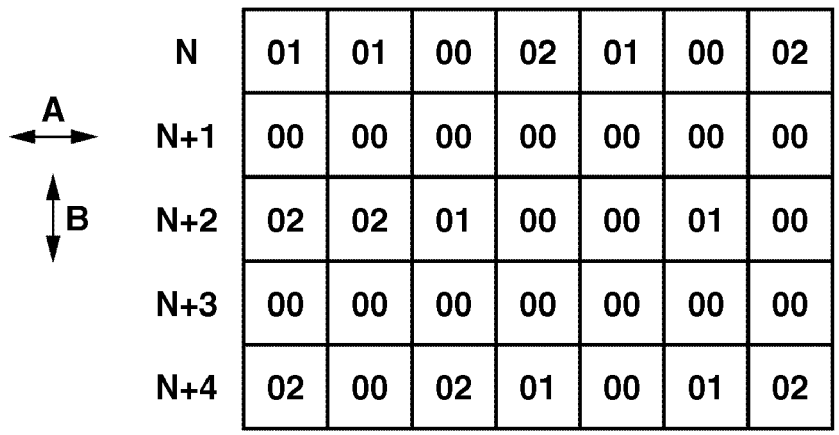

RECORDING APPARATUS AND PROCESSING METHOD EXECUTED BY THE RECORDING APPARATUS

BACKGROUND OF THE INVENTION

1. Field of the Invention

The present invention relates to a recording apparatus and a processing method executed by the recording apparatus.

2. Description of the Related Art

A conventional recording apparatus executes recording of an image on a recording medium. When data regarding an image to be recorded is received from a host apparatus, the conventional recording apparatus rasterizes the received data into binary bitmap data. In addition, the recording apparatus transfers the bitmap data to a recording head to execute the recording process.

As a method for rasterizing multivalued data into bitmap data, a conventional method generates and uses a rasterization table (i.e. a dot matrix) for the gradation (e.g. color-ranking or shade-ranking) of each pixel. In executing rasterization described above, if a fixed rasterization table (dot matrix) only is provided for the gradation of pixels and if the pixels have the same gradation, then the same rasterization pattern is obtained (i.e. a series of pixels with the same color or shade is printed). In executing rasterization using a fixed pattern, banding or image unevenness may occur due to smear on nozzles or unevenly discharged ink.

In order to address the above-described problem, a conventional method generates and uses a plurality of dot matrices for the gradation of each pixel. The conventional method like this selects one from among the plurality of matrices to execute rasterization. In this case, the pattern corresponding to each gradation is not fixed. Accordingly, the influence from the smear on the nozzles may not easily arise. Therefore, the conventional method is capable of reducing or suppressing unevenness that may otherwise occur due to unevenness of the mechanical accuracy of a recording head. In other words, a smoother transition of colour or shade from one pixel to the next in a raster is possible because the pixel colours or shades are determined based on one of several possible overall dot matrices.

Various methods for selecting one from among a plurality of dot matrixes have been conventionally proposed. Japanese Patent Application Laid-Open No. 09-046522 discusses a method for changing a dot matrix to be used for rasterization on gradation every time data having the same gradation is processed.

However, if the method discussed in Japanese Patent Application Laid-Open No. 09-046522 is used, the dot matrix is changed in order of appearance (i.e. in a printing direction) of data. Accordingly, a result of the rasterization in the forward raster direction (the forward scanning direction) may be different from a result of the rasterization in the backward raster direction (the backward scanning direction). Accordingly, in this case, it is necessary to fix the direction of rasterization.

In addition, a recording apparatus may include a plurality of recording modes, such as a single-pass recording mode and a multipass recording mode, either mode in which both single direction recording and bidirectional recording can be executed. Accordingly, in order to appropriately select a dot matrix, it is necessary also to consider the recording mode.

In the method discussed in Japanese Patent Application Laid-Open No. 09-046522, bitmap data that has been subjected to rasterization is stored on a buffer. In this case, it is necessary to secure a storage area larger than that necessary in storing multivalued data on a buffer without rasterizing it. Accordingly, the costs of manufacture may increase.

On the other hand, it is desired by the market that recording is executed at a high speed and that costs of manufacture of a recording apparatus is reduced. Therefore, it is necessary to reduce the time taken in executing rasterization processing. In addition, it is necessary to simplify the circuitry configuration of a recording apparatus.

SUMMARY OF THE INVENTION

According to an aspect of the present invention, a recording apparatus configured to cause a recording head to move and scan in a reciprocating manner includes a buffer configured to store raster data including multivalued data, a table in which a plurality of dot patterns is defined for a value of the multivalued data and including a dot pattern corresponding to the value, a first information storage unit configured to store an initial value of the dot pattern according to a direction of scanning by the recording head and the value of the multivalued data, a second information storage unit configured to store information indicating an empty raster in which every multivalued data of a raster has a value of "0", a determination unit configured to execute evaluation of the value of the multivalued data and determination as to whether a raster is the empty raster for each raster, a raster control unit configured to execute control for storing the initial value on the first information storage unit, control for storing the information on the second information storage unit, and control for storing multivalued data on the buffer according to a result of the evaluation and the determination by the determination unit, and a generation unit configured to, based on the initial value stored by the first information storage unit and the table, read the multivalued data from the buffer and generate a dot pattern based on the read multivalued data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIGS. 10A and 10B schematically illustrate an example of received data, which is transmitted from a receiving buffer provided in the controller to a raster control unit.

FIG. 11 illustrates an example of a rasterization pattern.

FIG. 12A illustrates an example of raster data. FIG. 12B illustrates an example of a method for storing information about an empty raster. FIG. 12C illustrates an example of a multivalued data storage unit.

DESCRIPTION OF THE EMBODIMENTS

Various exemplary embodiments, features, and aspects of the invention will be described in detail below with reference to the drawings.

A recording apparatus according to a first exemplary embodiment of the present invention, which employs an inkjet recording method, will be described in detail below. As the recording apparatus according to an exemplary embodiment of the present invention, it is useful to use a single function printer having a recording (i.e. printing) function only. It is also useful if a multifunction printer having a plurality of functions, such as a recording function, a facsimile transmission function, and a scanner function, is used as the recording apparatus according to an exemplary embodiment of the present invention. Furthermore, the present invention can be implemented on a manufacture apparatus configured to manufacture a color filter, an electronic device, an optical device, and a minute structure by using a predetermined recording method.

In the following description, the term "recording" or to "record" includes an operation or processing for generating information, such as text, a graphic, an image, a pattern, or a structure on a recording medium, or processing information to be stored on a recording medium. The recordal may be performed regardless of whether the information being recorded has become visible so that a user can visually recognize the information.

In addition, in the following description, the term "recording medium" refers to a medium on which the image or pattern is recorded. The recording medium is generally made of a material capable of receiving ink, such as paper, cloth, a plastic film, a metal plate, a glass material, a ceramic material, resin, wood, leather, etc. The term "ink" refers to a liquid, gel or similar that can be used in generating the image or pattern on a recording medium. The processing of the ink includes processing executed for solidification or insolubilization of a colorant included in the ink to be provided on a recording medium.

Figure 1:
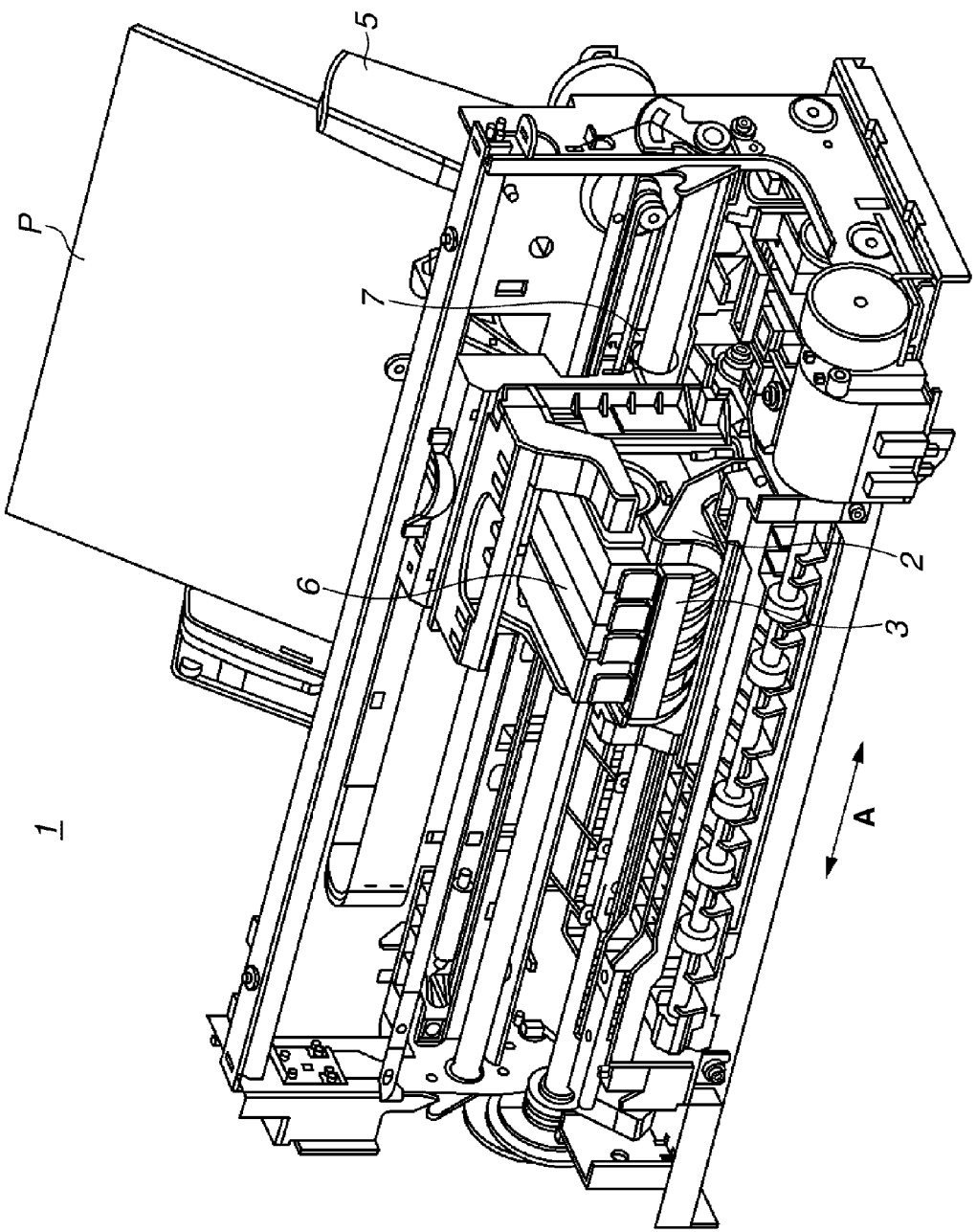
FIG. 1 is a perspective view illustrating an example of an external appearance and an exemplary configuration of an inkjet recording apparatus according to an exemplary embodiment of the present invention.

FIG. 1 is a perspective view of an exemplary configuration of an inkjet recording apparatus.

Referring to FIG. 1, an inkjet recording apparatus (hereinafter simply referred to as a "recording apparatus") 1 includes a carriage 2. The carriage 2 includes an inkjet recording head (hereinafter simply referred to as a "recording head") 3. The recording head 3 discharges ink by using the inkjet recording method to execute recording. During recording, the carriage 2 reciprocatingly moves along a carriage supporting member 7 in directions indicated by the arrow A.

The recording apparatus 1 feeds a recording medium P, such as a sheet of recording paper, via a paper feed mechanism 5, to a recording position. At the timing the recording medium P is fed to the recording position, the recording head 3 discharges ink onto the recording medium P. Thus, the recording apparatus 1 executes recording on the recording medium P.

The carriage 2 of the recording apparatus 1 includes an ink cartridge 6 as well as the recording head 3. The ink cartridge 6 contains ink to be supplied to the recording head 3. The ink cartridge 6 is detachably mounted on the carriage 2.

The recording apparatus 1 illustrated in FIG. 1 is capable of executing color recording. Accordingly, four ink cartridges containing magenta (M), cyan (C), yellow (Y), and black (k) inks are mounted on the carriage 2. The four ink cartridges can be mounted and dismounted separately and independently from one another.

The recording head 3 according to the present exemplary embodiment employs an inkjet printing method, in which ink is discharged by using thermal energy. Accordingly, the recording head 3 includes an electrothermal conversion member. The electrothermal conversion member is provided to each ink discharge port. Pulse voltage is applied to a corresponding electrothermal conversion member according to a recording signal. Then, ink is discharged from a corresponding ink discharge port.

Figure 2:
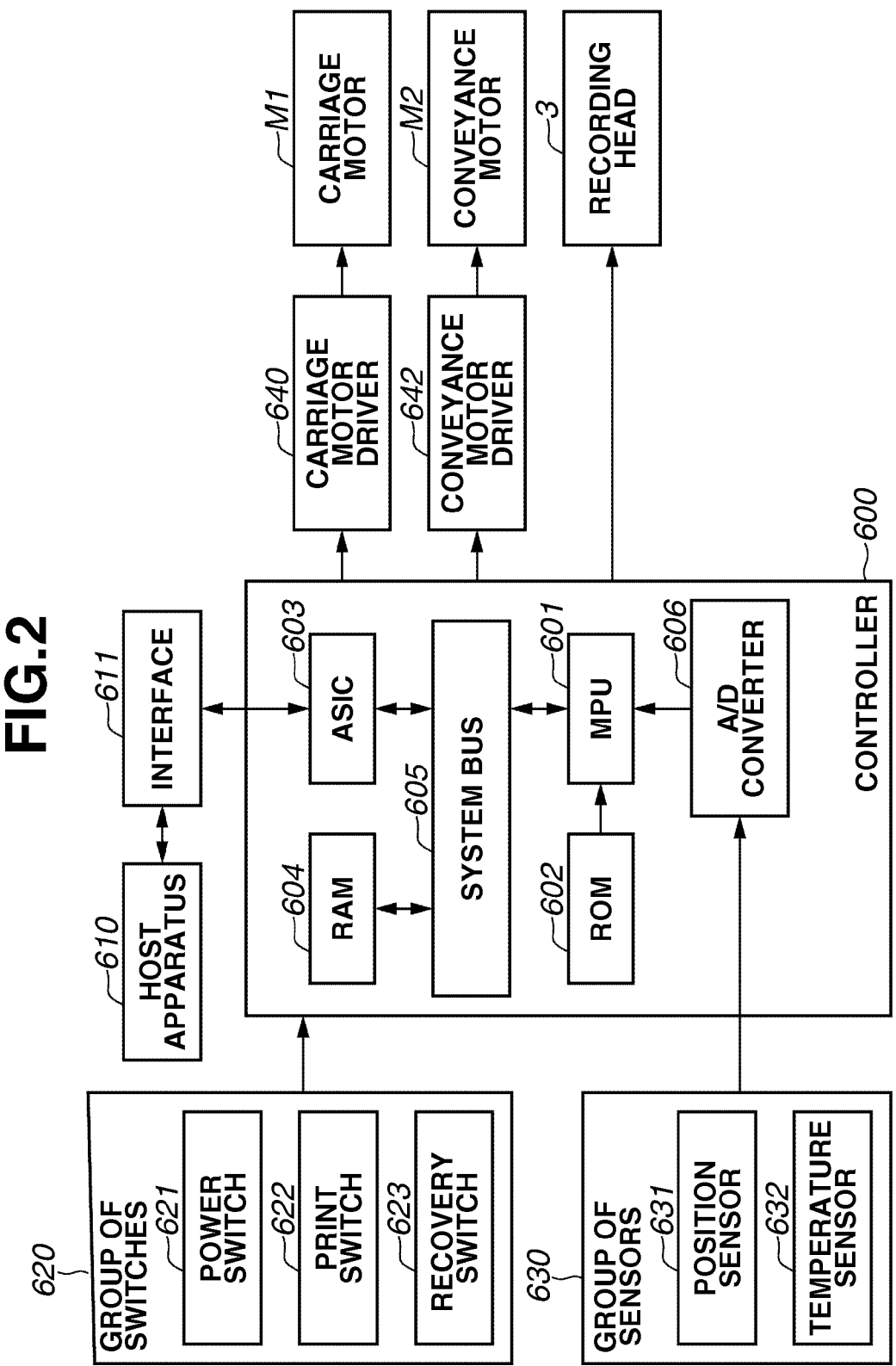
FIG. 2 illustrates an exemplary functional configuration of the recording apparatus illustrated in FIG. 1.

FIG. 2 illustrates an exemplary functional configuration of the recording apparatus 1 illustrated in FIG. 1. The recording apparatus 1 stores a plurality of rasterization tables (dot matrices) in correspondence with each gradation of multivalued data. The recording apparatus 1 rasterizes the multivalued data into bitmap data by using any one of the plurality of rasterization tables. Furthermore, the recording apparatus 1 executes gradation recording according to the bitmap data.

Every time data having the same gradation is processed, the recording apparatus 1 according to the present exemplary embodiment changes the rasterization table to be used for rasterization on the gradation. Accordingly, different rasterization patterns are generated for a plurality of pieces of data having the same gradation.

In the example illustrated in FIG. 2, a controller 600 includes a micro processing unit (MPU) 601, a read-only memory (ROM) 602, an application specific integrated circuit (ASIC) 603, a random access memory (RAM) 604, a system bus 605, and an analog-to-digital (A/D) converter 606. In the present exemplary embodiment, the ROM 602 stores a program corresponding to the following control sequence, a predetermined table, and other fixed data. The ASIC 603 controls a carriage motor M1 via a carriage motor driver 640 and a conveyance motor M2 via a conveyance motor driver 642. In addition, the ASIC 603 generates a control signal, which is used for controlling the recording head 3.

The RAM 604 is used as a work area for rasterization of image data and for executing a program thereon. The MPU 601, the ASIC 603, and the RAM 604 are in communication with one another via the system bus 605 to transmit and receive data therebetween. The A/D converter 606 converts an analog signal, which is input by sensors, into a digital signal (i.e., executes A/D conversion on the analog signal) and supplies the digital signal generated by the conversion to the MPU 601.

A switch group 620 includes a power switch 621, a print switch 622, and a recovery switch 623. A sensor group 630 includes sensors for detecting the state of the recording apparatus 1, such as a position sensor 631 and a temperature sensor 632.

During scanning and recording by the recording head 3, the ASIC 603, while directly accessing a storage area of the RAM 604, transfers dot data (binary data) for driving a recording element (a discharge heater) to the recording head 3.

The carriage motor M1 is a drive source for causing the carriage 2 to reciprocatingly move and scan in the directions indicated by arrow A illustrated in FIG. 1. A carriage motor driver 640 controls driving of the carriage motor M1. The conveyance motor M2 is a drive source for conveying the recording medium P. A conveyance motor driver 642 controls driving of the conveyance motor M2.

A recording head control unit 644 (shown in FIG. 3) controls the recording head 3 according to recording data input from the controller 600. The recording head 3 is caused to move and scan in a direction perpendicular to the conveyance direction of the recording medium P (hereinafter simply referred to as a "scanning direction").

The recording by the recording head 3 is executed in the single-pass recording mode (both executing single-direction recording and bidirectional recording can be executed) or the multipass recording mode (both single-direction recording and bidirectional recording can be executed).

In the example illustrated in FIG. 2, a computer 610 is a source of supplying image data (alternatively, a reader apparatus configured to read an image or a digital camera). The computer 610 is simply referred to as a host apparatus.

Between the host apparatus 610 and the recording apparatus 1, image data, a command, and a status signal are transmitted and received via an interface (I/F) 611. The image data is input as data having a format of a raster (hereinafter simply referred to as "raster data").

Figure 3:
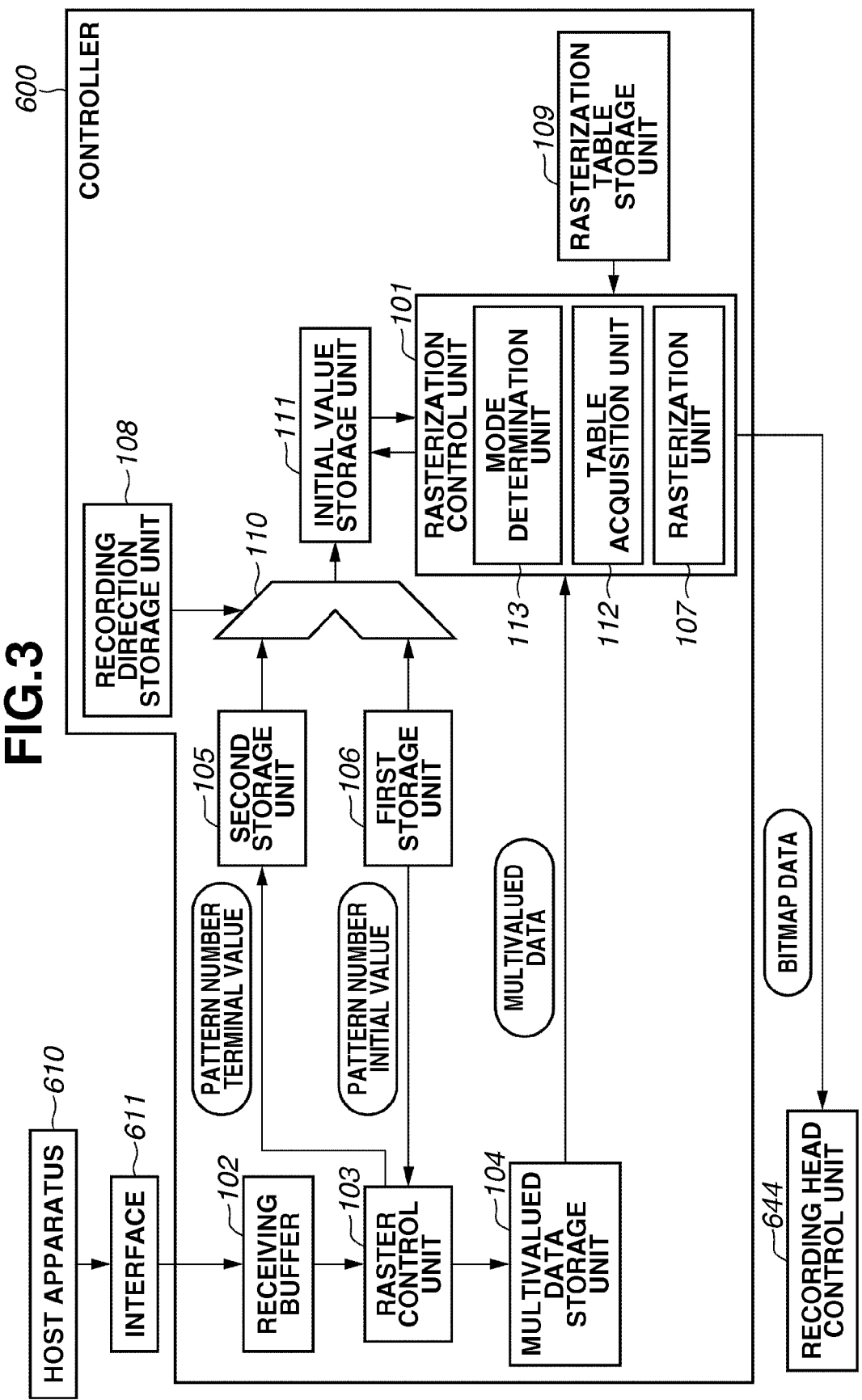
FIG. 3 illustrates an exemplary functional configuration of a controller illustrated in FIG. 2.

FIG. 3 illustrates an exemplary functional configuration of the controller 600 illustrated in FIG. 2. Referring to FIG. 3, the controller 600 includes or is connected to an I/F 611 for communicating with the host apparatus 610. The controller includes a receiving buffer 102, a raster control unit 103, a multivalued data storage unit 104, a second storage unit 105, a first storage unit 106, and a rasterization control unit (a generation unit) 101. In addition, the controller 600 includes a recording direction storage unit 108, a rasterization table storage unit 109, a selector 110, and an initial value storage unit 111.

The I/F 611 receives raster data from the host apparatus 610. The receiving buffer 102 temporarily stores the data received by the I/F 611 from the host apparatus 610 as received data. The data stored on the receiving buffer 102 includes raster data. In the present exemplary embodiment, the raster data may also be simply referred to as a "raster". The raster data (each raster) stored on the receiving buffer 102 is transmitted to the raster control unit 103.

Now, the raster data will be described in detail below with reference to FIGS. 10A and 10B. Referring to FIG. 10A, in the raster data, quantized data (multivalued data) 201 is arranged in the scanning direction (indicated by arrow A in FIG. 10A) of the recording head. The leading edge 205 of each raster corresponds to the left edge of the recording medium while the trailing edge 206 of each raster corresponds to the right edge of the recording medium. Raster data (202, 203, and 204) are arranged with respect to each other in a direction perpendicular to the scanning direction A (indicated by arrow B in FIG. 10B).

The first storage unit 106 stores an initial value of an identification number (hereinafter simply referred to as a "pattern number") of the leading edge of the raster (the raster left edge). More specifically, the first storage unit 106 stores an initial value of the pattern number in forward recording. The initial value of the pattern number is stored in correspondence with each gradation. The pattern number corresponds to each rasterization table. The initial value of the raster left edge can be arbitrarily set.

The second storage unit 105 stores an initial value of the pattern number of the trailing edge of the raster (the raster right edge). More specifically, the second storage unit 105 stores an initial value of the pattern number in backward recording. The initial value of the pattern number is stored in correspondence with each gradation.

The raster control unit 103 acquires data 201 of each raster from the receiving buffer 102. The raster control unit 103 executes horizontal-vertical (HV) conversion on the acquired raster. In addition, the raster control unit 103 stores the converted data on the multivalued data storage unit 104. In storing the data, the raster control unit 103 checks (evaluates) the gradation of each data (multivalued data) within the raster.

Now, method for checking raster data illustrated in FIG. 10B, which method is executed by the raster control unit 103, will be described in detail below. In the example illustrated in FIG. 10B, the raster data 201 includes four pieces of "level 01 data", three pieces of "level 02 data", and two pieces of "level 03 data".

The raster control unit 103 acquires the pattern number corresponding to the rasterization table for each gradation. In the present exemplary embodiment, the pattern number is stored on the first storage unit 106. In addition, the raster control unit 103 changes (increments or decrements) the acquired pattern number every time multivalued data having the same gradation is processed.

In the example illustrated in FIG. 10B, if the pattern number of the level 03 data, which has been acquired from the first storage unit 106, is "1", the level 03 data (201) is acquired twice. The raster control unit 103 increments the pattern number by 2 and as a result, the pattern number becomes "3". The above-described processing is executed on the other level data (01 and 02), too.

After setting the rasterization table for all rasters, the raster control unit 103 stores the pattern number of the rasterization table corresponding to each gradation, which pattern number has been incremented or decremented, on the second storage unit 105. The raster control unit 103 then executes the above-described processing on subsequent raster data.

Furthermore, because the second storage unit 105 includes pattern numbers of a plurality of rasters, the raster control unit 103 manages the position of the raster (the raster number). As described above, the second storage unit 105 previously stores the pattern number of the rasterization table corresponding to each raster, which is to be used in recording in the backward direction.

The recording direction storage unit 108 stores the direction of rasterization by a rasterization unit 107 (i.e., the direction of scanning by the recording head 3) as designated recording direction information. The designated recording direction information is stored for each raster.

The rasterization table storage unit 109 functions as a matrix storage unit for storing the rasterization table (the dot matrix). A plurality of rasterization tables is stored for each gradation as illustrated in FIG. 11. The rasterization table illustrated in FIG. 11 includes rasterization tables (patterns) of levels 00 through 03. In addition, each rasterization table includes 2×2 dot-dot data.

In the example illustrated in FIG. 11, black dots, each of which is indicated as a black rectangle in FIG. 11, are dots (pixels) to be recorded. In addition, white dots, each of which is indicated as a white rectangle in FIG. 11, are dots (pixels) not to be recorded.

In the rasterization table, a single pattern 1 is set for the level 00. Patterns 1 through 4 are set for each of the levels 01 through 03. Each of the patterns 1 through 4 is allocated with a pattern number (e.g. pattern numbers 1 to 16 or 1 to 13, depending on how many different patterns there are). The size of the rasterization table is determined according to the number of quantization operations (the number of gradations) when multivalued data is quantized. In the present exemplary embodiment, the rasterization table used in rasterizing multivalued data having the same gradation is allocated with pattern numbers including serial numbers (sequential numbers).

The selector 110 determines the recording direction according to the designated recording direction information. In addition, the selector 110 selects the data stored on the first storage unit 106 during forward recording. On the other hand, the selector 110 selects the data stored on the second storage unit 105 during backward recording. Accordingly, the initial pattern number according to the recording direction is stored on the initial value storage unit 111.

Which of the first storage unit 106 and the second storage unit 105 is to be used as the source from which the pattern number is to be acquired is determined every time recording by the recording head 3 executed according to the recording width of the recording head 3 is completed. As will be described in detail below, the above-described determination (selection) processing is not executed during bidirectional multipass recording (more specifically, in recording after the second pass).

The rasterization control unit (generation unit) 101 rasterizes multivalued data into bitmap data. The rasterization control unit 101 includes a table acquisition unit 112, a mode determination unit 113, and the rasterization unit 107.

In order to rasterize the data to be rasterized, the table acquisition unit 112 acquires the rasterization table from the rasterization table storage unit 109. Acquisition of the rasterization table is executed for each raster. More specifically, the table acquisition unit 112 acquires the pattern number expanded and stored on the initial value storage unit 111 as the initial value. Subsequently, the table acquisition unit 112 serially acquires the rasterization tables corresponding to the pattern number while incrementing or decrementing the acquired pattern number every time multivalued data having the same gradation is processed.

The mode determination unit 113 determines the recording mode. More specifically, the mode determination unit 113 determines and which of single-direction recording and bidirectional recording is to be used in executing recording.

In executing the single direction recording, the carriage 2 is moved only in either one of the forward direction and the backward direction (in the present exemplary embodiment, the forward direction only) to execute scanning for the recording operation.

On the other hand, in executing bidirectional recording, the recording is bidirectionally executed in the forward and backward directions in the main scanning direction of the carriage 2. In the single-pass recording mode, the recording is executed on different areas every time the carriage 2 is moved. On the other hand, in the multipass recording mode, the recording is executed by moving the carriage 2 for a plurality of number of times in either one of the forward and backward directions for the same recording area.

The rasterization unit 107 acquires data from the multivalued data storage unit 104 for each raster. In addition, the rasterization unit 107 rasterizes the acquired raster into bitmap data. The rasterization table acquired by the table acquisition unit 112 is used for the rasterization.

The data size of the bitmap data rasterized by the rasterization unit 107 is larger than that of the multivalued data. After being rasterized by the rasterization unit 107, the bitmap data is transmitted to the recording head control unit 644. Then, the recording head control unit 644 controls the recording head 3 according to the received bitmap data to execute recording.

An exemplary flow of processing executed by the recording apparatus 1 illustrated in FIG. 1 will be described in detail below with reference to FIG. 4. The processing illustrated in FIG. 4 is executed after receiving data from the host apparatus 610.

Figure 4:
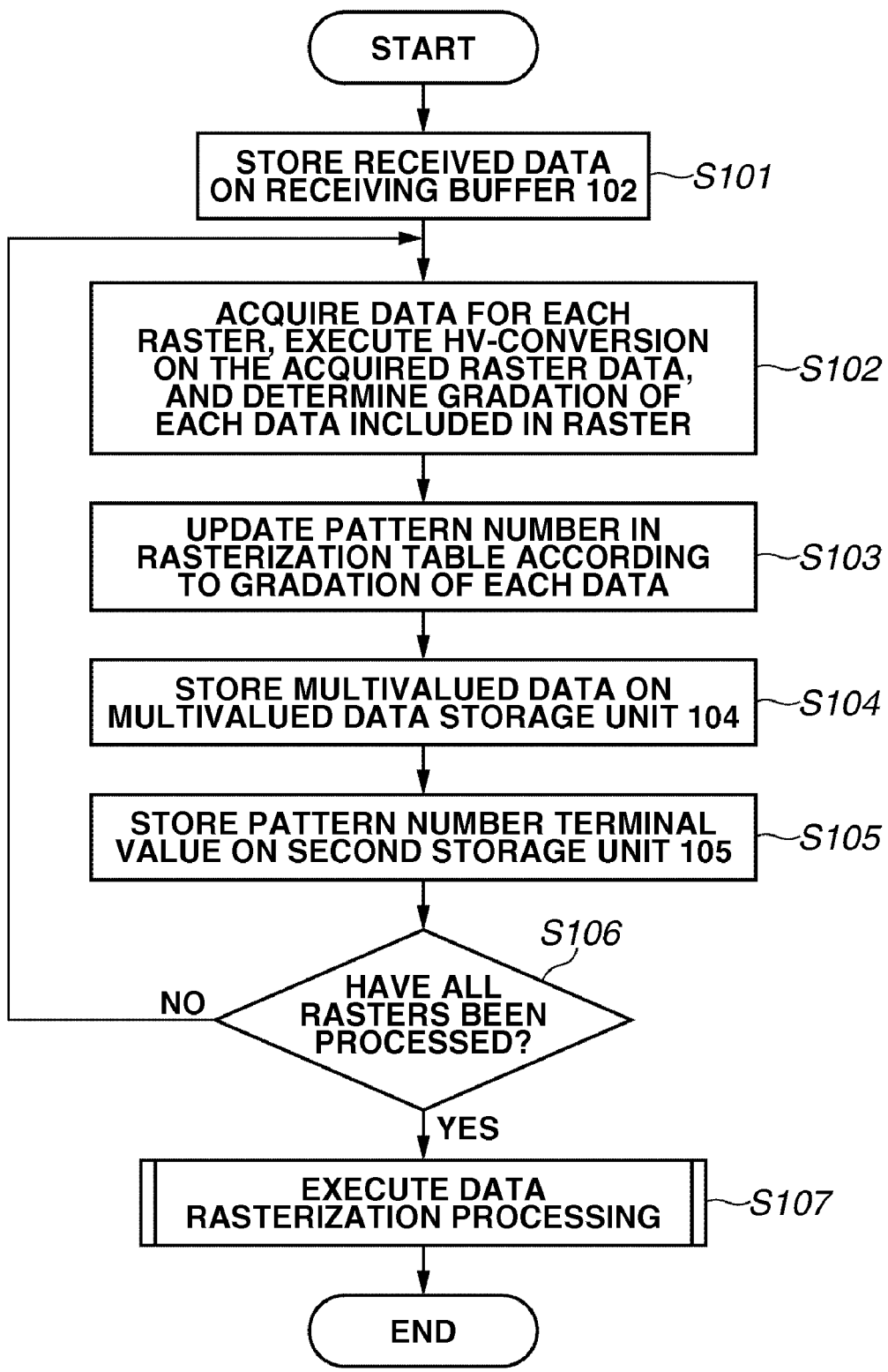
FIG. 4 is a flow chart illustrating an example of processing executed by the recording apparatus illustrated in FIG. 1.

Referring to FIG. 4, in step S101, the recording apparatus 1 stores the received data on the receiving buffer 102. More specifically, the raster control unit 103 acquires data from the receiving buffer 102 for each raster. In step S102, the raster control unit 103 HV-converts the acquired raster and determines the gradation of each data within the raster.

In step S103, the raster control unit 103 updates the pattern number of the rasterization table in correspondence with the gradation of each data. More specifically, in updating the pattern number in step S103, the raster control unit 103 acquires the initial value of the pattern number corresponding to each gradation from the first storage unit 106. In addition, the raster control unit 103 sets the pattern number to each data according to the initial value. In other words, the raster control unit 103 increments the pattern number every time data having the same gradation is processed and sets the corresponding pattern number on each data.

After updating the pattern number, the processing advances to step S104. In step S104, the raster control unit 103 stores the raster of the multivalued data on the multivalued data storage unit 104. In step S105, the raster control unit 103 stores the pattern number (the value at the trailing edge) at the time all the rasters are completely processed on the second storage unit 105. In step S106, the recording apparatus 1 determines whether all the rasters have been completely processed. If it is determined that the processing of all the rasters has not been completed yet (NO in step S106), then the processing returns to step S102. In this case, the recording apparatus 1 repeats the processing in steps S102 through S105 until all the rasters are completely processed.

After completing the processing up to step S105 and if all rasters have been processed (YES in S106), the processing advances to step S107. In step S107, the recording apparatus 1 executes the rasterization processing. Then, the processing ends.

Figure 5:
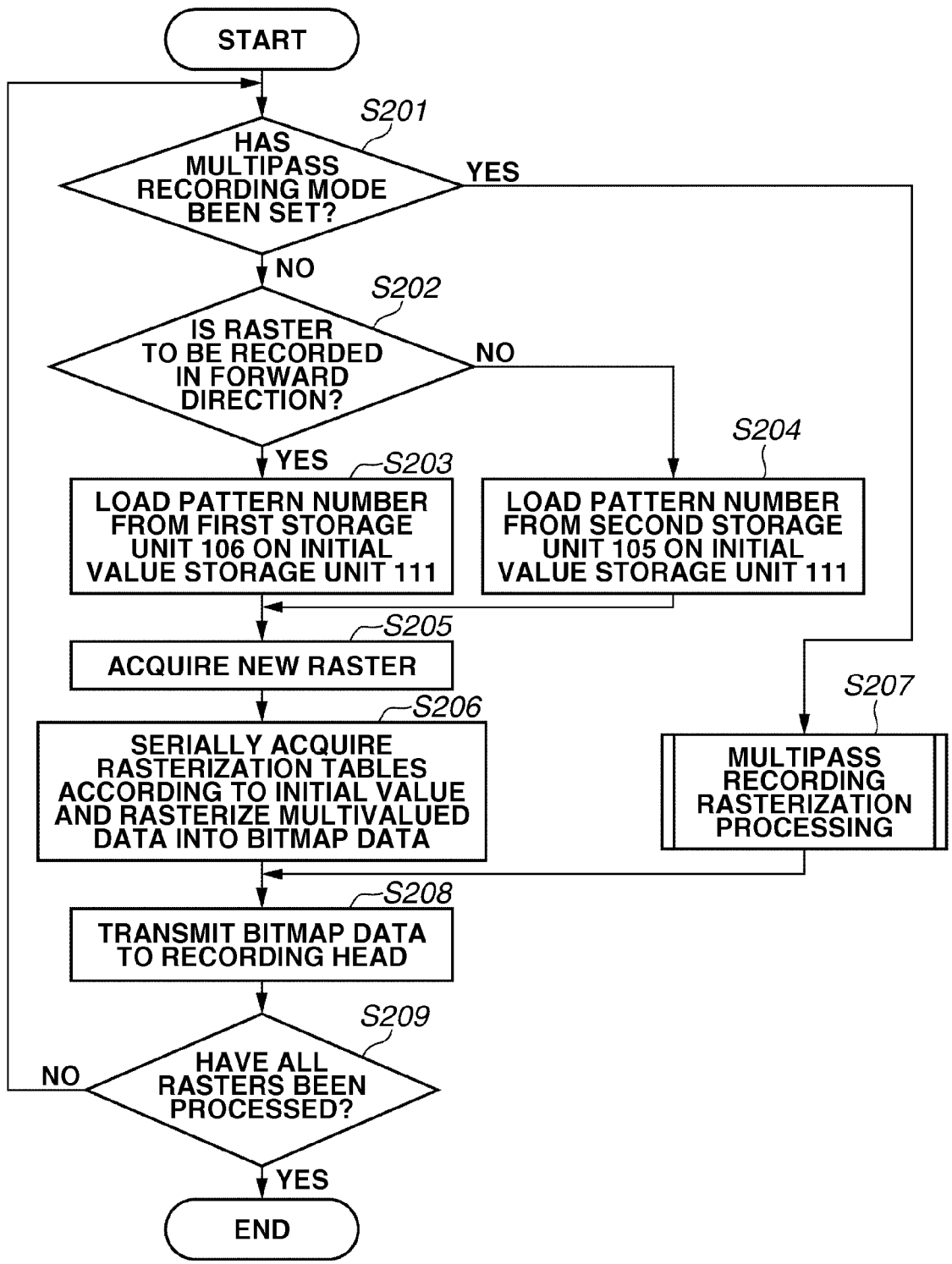
FIG. 5 is a flow chart illustrating an example of data rasterization processing, which is executed in step S107 illustrated in FIG. 4.

Now, an exemplary flow of the data rasterization processing in step S107 illustrated in FIG. 4 will be described in detail below with reference to FIG. 5. When the data rasterization processing starts, the recording apparatus 1 uses the mode determination unit 113 to determine the recording mode in step S201. More specifically, the mode determination unit 113 determines which of the single-pass recording mode and the multipass recording mode is set as the recording mode.

If it is determined that the multipass recording mode has been set (YES in step S201), then the processing advances to step S207. In step S207, the recording apparatus 1 executes multipass recording and rasterization processing. The multipass recording and rasterization processing executed in step S207 will be described in detail later below.

In step S208, the recording apparatus 1 transmits the bitmap data resulting from the rasterization processing from the rasterization unit 107 to the recording head control unit 644.

The recording head control unit 644 controls the recording head 3 according to the received bitmap data to execute recording. In step S209, the recording apparatus 1 determines whether all the rasters have been completely processed. If it is determined that all the rasters have not been completely processed yet (NO in step S209), then the processing returns to step S201. In this case, the processing in steps S201 through S208 is repeated until all the rasters are completely processed.

If it is determined that the multipass recording mode has not been set (NO in step S201), the processing advances to step S202. In step S202, the recording apparatus 1 determines whether the rasterization (recording) direction of the raster to be rasterized (recorded) is the forward direction by using the selector 110. The determination in step S202 is executed based on the designated recording direction information stored on the recording direction storage unit 108.

If it is determined that the recording is to be executed in the forward direction (YES in step S202), then the processing advances to step S203. In step S203, the recording apparatus 1 selects the data stored on the first storage unit 106. In addition, in step S203, the recording apparatus 1 loads the pattern number from the first storage unit 106 onto the initial value storage unit 111.

If it is determined that the recording is to be executed in the backward direction (NO in step S202), then the processing advances to step S204. In step S204, the selector 110 selects the data stored on the second storage unit 105. In addition, in step S204, the selector 110 of the recording apparatus 1 loads the pattern number from the second storage unit 105 onto the initial value storage unit 111.

After loading the initial value of the pattern number on the initial value storage unit 111, the recording apparatus 1 uses the rasterization unit 107 to check (determine) the direction of rasterization of the data according to the designated recording direction information stored on the recording direction storage unit 108.

After checking the direction of rasterization, the processing advances to step S205. In step S205, the recording apparatus 1 uses the rasterization unit 107 to read the multivalued data from the multivalued data storage unit 104. In step S206, the table acquisition unit 112 acquires the rasterization table according to the initial value of the pattern number stored on the initial value storage unit 111. Furthermore, the rasterization unit 107 of the recording apparatus 1 rasterizes the multivalued data into bitmap data according to the acquired rasterization table and the direction of rasterization.

If the direction of rasterization is the forward raster direction (forward scanning direction), then the initial value of the pattern number is read from the first storage unit 106. In addition, the recording apparatus 1 increments the pattern number every time the data having the same gradation is processed.

On the other hand, if the direction of rasterization is the backward raster direction (backward scanning direction), then the initial value of the pattern number is read from the second storage unit 105. In addition, the recording apparatus 1 decrements the pattern number every time the data having the same gradation is processed.

In step S208, the rasterization unit 107 of the recording apparatus 1 transmits the rasterized bitmap data from the rasterization unit 107 to the recording head control unit 644. Then, the recording head control unit 644 controls the recording head 3 according to the received bitmap data to execute recording.

In step S209, the recording apparatus 1 determines whether all the rasters have been completely processed. If it is determined that the processing of all the rasters has not been completed yet (NO in step S209), then the processing returns to step S201. In this case, the recording apparatus 1 repeats the processing in steps S201 through S208 until all the rasters are completely processed.

The flow of processing executed by the recording apparatus 1 described above with reference to FIG. 5 is a mere example and the present invention is not limited to this. More specifically, the processing illustrated in FIG. 5 can be appropriately modified. For example, it is also useful if the transmission of the bitmap data to the recording head control unit 644 is executed after the rasterization of all the rasters into bitmap data is completed. Alternatively, it is also useful if the processing in different steps described above is executed in parallel to one another.

An exemplary flow of multipass recording and rasterization processing in step S207 illustrated in FIG. 5 will be described in detail below with reference to FIG. 6. When the multipass recording and rasterization processing starts, in step S301 illustrated in FIG. 6, the recording apparatus 1 determines whether the current rasterization pattern is processing for the first pass. If it is determined that the current rasterization pattern is processing for the first pass (YES in step S301), then the processing advances to step S302 and executes the processing in step S302 and following steps. The processing in steps S302 through S305 is substantially similar to the processing in steps S202 through S205 described above with reference to FIG. 5. Accordingly, the description thereof will not be repeated here.

The processing in step S306 is slightly different from that in step S206. More specifically, in step S306, the recording apparatus 1 uses the rasterization unit 107 to thin out the data acquired from the multivalued data storage unit 104 according to the number of times the recording head 3 scans the same recording area to rasterize the data into bitmap data. In this way, during multipass recording, the recording can be executed by scanning the carriage 2 a plurality of times across the same recording area. The method for executing the thinning processing can be executed by a known method. Accordingly, the thinning method will not be described in detail here.

After completely rasterizing the data into bitmap data in step S306, the processing advances to step S307. In step S307, the recording apparatus 1 determines whether the recording is executed by bidirectional recording. If it is determined that the multipass recording is executed by single direction recording (NO in step S307), then the processing ends there.

On the other hand, if it is determined that the multipass recording is executed by bidirectional recording (YES in step S307), then the processing advances to step S308. In step S308, the recording apparatus 1 writes the pattern number (the value at the trailing edge) at the time the rasterization processing in step S306 is completed on the initial value storage unit 111. Then, the processing ends.

Figure 6:
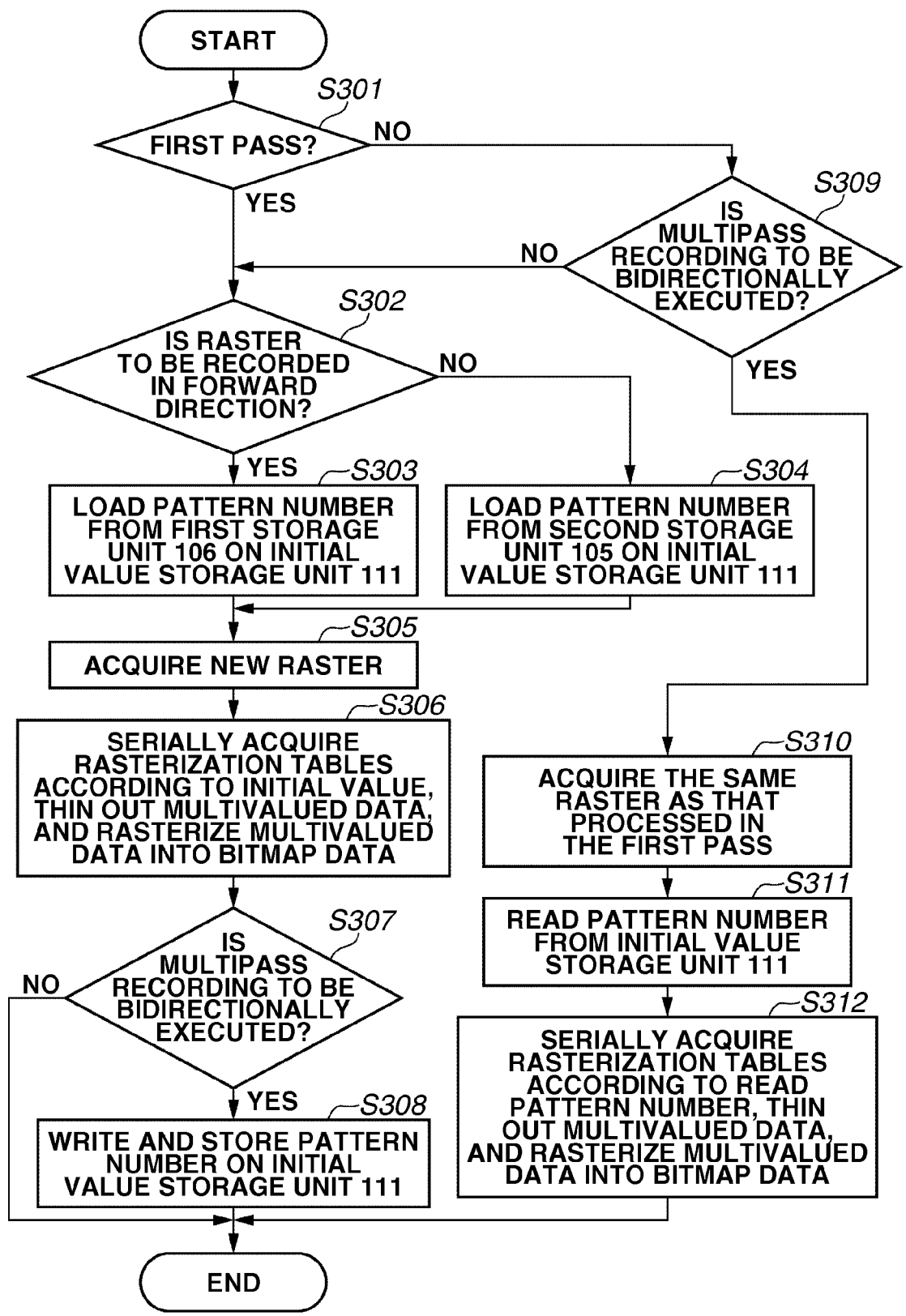
FIG. 6 is a flow chart illustrating an example of multipass recording and rasterization processing, which is executed in step S207 illustrated in FIG. 5.

Returning to the top of the flow chart of FIG. 6, if it is determined that the current rasterization pattern is processing for the second pass or following passes (NO in step S301), then the processing advances to step S309. In step S309, the mode determination unit 113 of the recording apparatus 1 determines whether the multipass recording is to be executed by bidirectional recording.

If it is determined that the multipass recording is to be executed by single direction recording (NO in step S309), then the processing returns to step S302 and the recording apparatus 1 repeats the processing in step S302 and the following steps. On the other hand, if it is determined that the multipass recording is to be executed by bidirectional recording (YES in step S309), then the recording apparatus 1 checks the direction of rasterization of the data according to the designated recording direction information stored on the recording direction storage unit 108.

After checking the raster direction, the recording apparatus 1 uses the rasterization unit 107 to read the same multivalued data as that in the first pass from the multivalued data storage unit 104 in step S310. The recording apparatus 1 uses the table acquisition unit 112 to acquire the rasterization table according to the initial value of the pattern number stored on the initial value storage unit 111.

The initial value of the pattern number stored on the initial value storage unit 111 is the same as that of the pattern number written in step S308. More specifically, in executing multipass recording by bidirectional recording, in the rasterization for the second pass and following passes, the recording apparatus 1 does not store the initial value by using the selector 110 or the first storage unit 106.

After acquiring the initial value of the pattern number, then in step S311, the rasterization unit 107 of the recording apparatus 1 rasterizes the multivalued data into bitmap data based on the rasterization table and the raster direction acquired in the above-described manner. More specifically, in step S312, similar to the processing in step S306 described above, the rasterization unit 107 thins out the data acquired from the multivalued data storage unit 104 according to the number of times of scanning by the recording head 3 on the same recording area and rasterizes the thinned data into bitmap data. Then, the processing ends.

With the above-described configuration, the present exemplary embodiment, which is configured to change the rasterization table used in rasterization for each gradation every time data having the same gradation is processed, can match a result of recording among single direction recording, bidirectional recording, and multipass recording.

In addition, in multipass recording in the case of bidirectional recording, the processing for storing the initial value of the pattern number can be simplified for the second pass and following passes. More specifically, for the second pass and following passes, it is not necessary to write the initial value of the pattern number on the initial value storage unit 111 by using the selector 110 or the first storage unit 106. Accordingly, the present exemplary embodiment having the above-described configuration can reduce the time taken for the processing because the processing for acquiring the initial value of the pattern number can be omitted for the second pass and following passes in multipass recording. In addition, the present exemplary embodiment having the above-described configuration can simplify the circuitry configuration for implementing the initial value acquisition processing.

In addition, according to the present exemplary embodiment having the above-described configuration, the required capacity of the buffer can be reduced because the present exemplary embodiment directly stores the input data on the multivalued data storage unit 104 as multivalued data.

Furthermore, as described above, the present exemplary embodiment stores a plurality of rasterization tables for each gradation and executes the rasterization by using either one of the rasterization tables. Accordingly, the present exemplary embodiment having the above-described configuration can reduce banding or image unevenness.

In addition, as described above, the initial value of the top portion of the raster (the raster left edge) can be arbitrarily set according to the present exemplary embodiment. Accordingly, if the initial value is arbitrarily set, the present exemplary embodiment can prevent having to use a fixed pattern even if the same data is present in the vertical direction over a plurality of rasters.

A second exemplary embodiment of the present invention will be described in detail below. The configuration of the recording apparatus 1 according to the second exemplary embodiment is similar to the configuration described above with reference to FIGS. 1 and 2 in the first exemplary embodiment described above. Accordingly, the description thereof will not be repeated here. In the following description, differences from the first exemplary embodiment only will be described in detail. As one difference point from the first exemplary embodiment, the present exemplary embodiment detects an empty raster.

FIG. 12A illustrates an example of data including five rasters (N to N+4) each corresponding to each location on paper. In the example illustrated in FIG. 12A, the "N+1" raster and the "N+3" raster are empty rasters.

Figure 7:
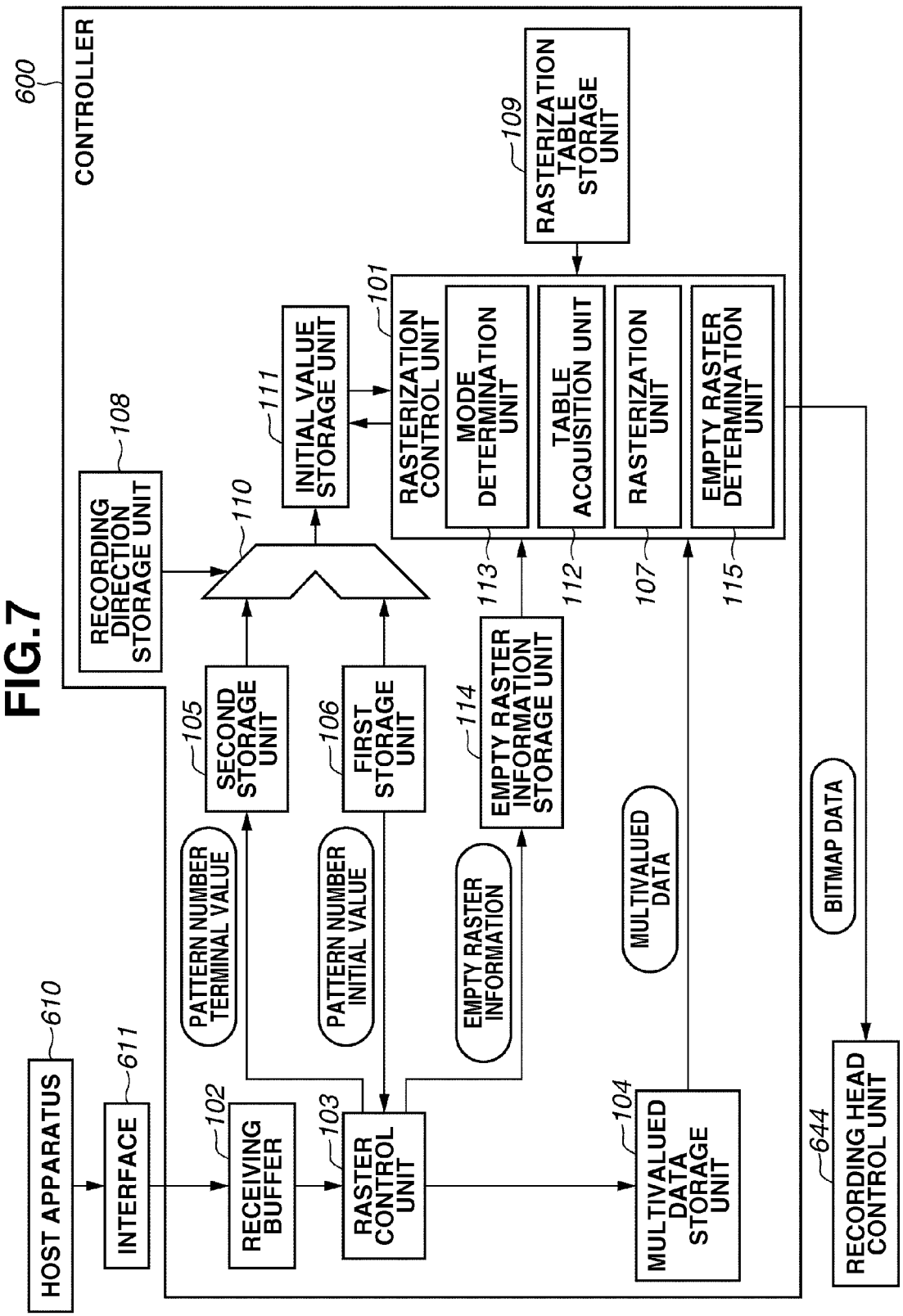
FIG. 7 illustrates an exemplary functional configuration of a controller according to a second exemplary embodiment of the present invention.

Now, an exemplary functional configuration of a controller 600 according to the present exemplary embodiment will be described in detail below with reference to FIG. 7. The components and units of the controller 600 according to the present exemplary embodiment similar to those illustrated in FIG. 3 and described above in the first exemplary embodiment are provided with the same reference numerals and symbols as those illustrated in FIG. 3. Accordingly, the description thereof will not be repeated here.

The controller 600 according to the present exemplary embodiment includes an empty raster information storage unit 114 and an empty raster determination unit 115 in addition to the components of the first exemplary embodiment. The empty raster information storage unit 114 stores information about an empty raster for which all values of multivalued data of each raster has a value of "0" (the gradation value is "0"). Hereinbelow, the above-described information is simply referred to as "empty raster information".

In executing rasterization of raster data, the empty raster determination unit 115 is configured to determine whether the raster data to be processed is an empty raster. A result of the determination by the empty raster determination unit 115 is stored on the empty raster information storage unit 114.

FIG. 12B illustrates an example of the empty raster information storage unit 114. Referring to FIG. 12B, the empty raster information storage unit 114 stores information "1", which indicates an empty raster, at addresses corresponding to "N+1" and "N+3" rasters. FIG. 12C illustrates an exemplary result obtained by the raster control circuit 103 storing raster data on the multivalued data storage unit 104. Similar to the first exemplary embodiment, in storing the multivalued data on the multivalued data storage unit 104, the raster control unit 103 allocates the pattern number.

Figure 13A:
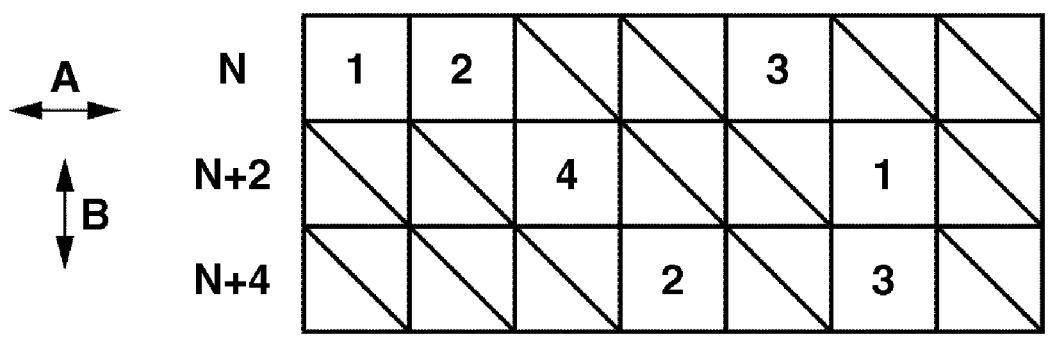
FIG. 13A illustrates an example of allocation of a pattern of multivalued data.

FIG. 13A illustrates an exemplary method for allocating the pattern number for the level 01 of the multivalued data illustrated in FIGS. 12A and 12C. As described above in the first exemplary embodiment, four patterns are provided for the level 01 as illustrated in FIG. 11. Accordingly, the raster control unit 103 serially allocates patterns 1 through 4 to N through "N+4" rasters. For example, referring to FIG. 12A, in the "N" raster, the values of the first, second, and fifth pixels counting from the left edge indicate "01". Similarly, in the "N+2" raster, the values of the third and sixth pixels counting from the left edge indicate "01". Accordingly, referring to FIG. 13A, the pattern numbers "1", "2", and "3" are allocated to the "N" raster as serial numbers. Then, the pattern numbers "4" and "1" are allocated to the "N+2" raster as serial numbers. Similarly, the pattern numbers "2" and "3" are allocated to the "N+4" raster as serial numbers.

Figure 13B:
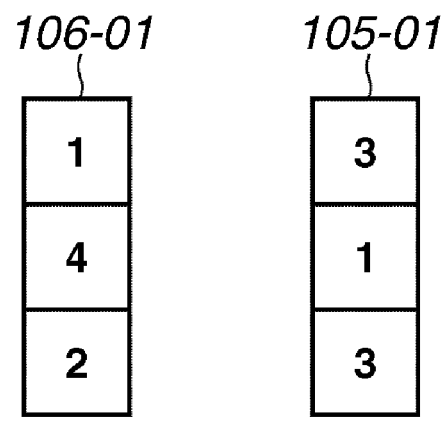
FIG. 13B illustrates an example of a method for storing information about a left edge and a right edge of multivalued data of a raster.

FIG. 13B illustrates an example of a method for storing the initial value of the dot pattern for the level 01. The first storage unit 106 and the second storage unit 105 store the initial value corresponding to the scanning direction. For the raster data whose multivalued data having a value other than "0" does not appear (i.e., the raster data whose value (level) of all the multivalued data included in the raster data is "00"), the raster control unit 103 does not allocate a pattern number. Accordingly, in this case, neither the first storage unit 106 nor the second storage unit 105 stores information about the empty raster. Referring to FIG. 13B, the pattern numbers closest to the left edge in the respective rasters are stored in the storage area 106-01, and the pattern numbers closest to the right edge in the respective rasters are stored in the storage area 105-01. For example, the pattern number closest to the left edge in the "N" raster is "1" and the pattern number closest to the right edge in the "N" raster is "3". Such numbers "1" and "3" are stored in the storage areas 106-01 and 105-01, respectively. The pattern number closest to the left edge in the "N+2" raster is "4" and the pattern number closest to the right edge in the "N+2" raster is "1". Such numbers "4" and "1" are stored in the storage areas 106-01 and 105-01, respectively.

In the present exemplary embodiment, an address of the storage location of the raster data on the multivalued data storage unit 104 (within the buffer) is stored on the empty raster information storage unit 114 as empty raster information.

Now, an exemplary method for generating bitmap data, which is executed by the rasterization control unit 101, will be described in detail below. The rasterization control unit 101 reads multivalued data from the multivalued data storage unit 104 and generates bitmap data based on the read multivalued data. In addition, the rasterization control unit 101 stores the generated bitmap data on a transfer buffer included in the rasterization control unit 101.

In rasterizing raster data, the rasterization control unit 101 uses the empty raster determination unit 115 to refer to the data stored on the empty raster information storage unit 114. If the raster data to be rasterized is an empty raster, then the rasterization control unit 101 does not load a pattern number from the second storage unit 105 or the first storage unit 106. In addition, in this case, the rasterization unit 107 does not execute rasterization for that raster data. Accordingly, the present exemplary embodiment can reduce a data bus band.

Figure 8:
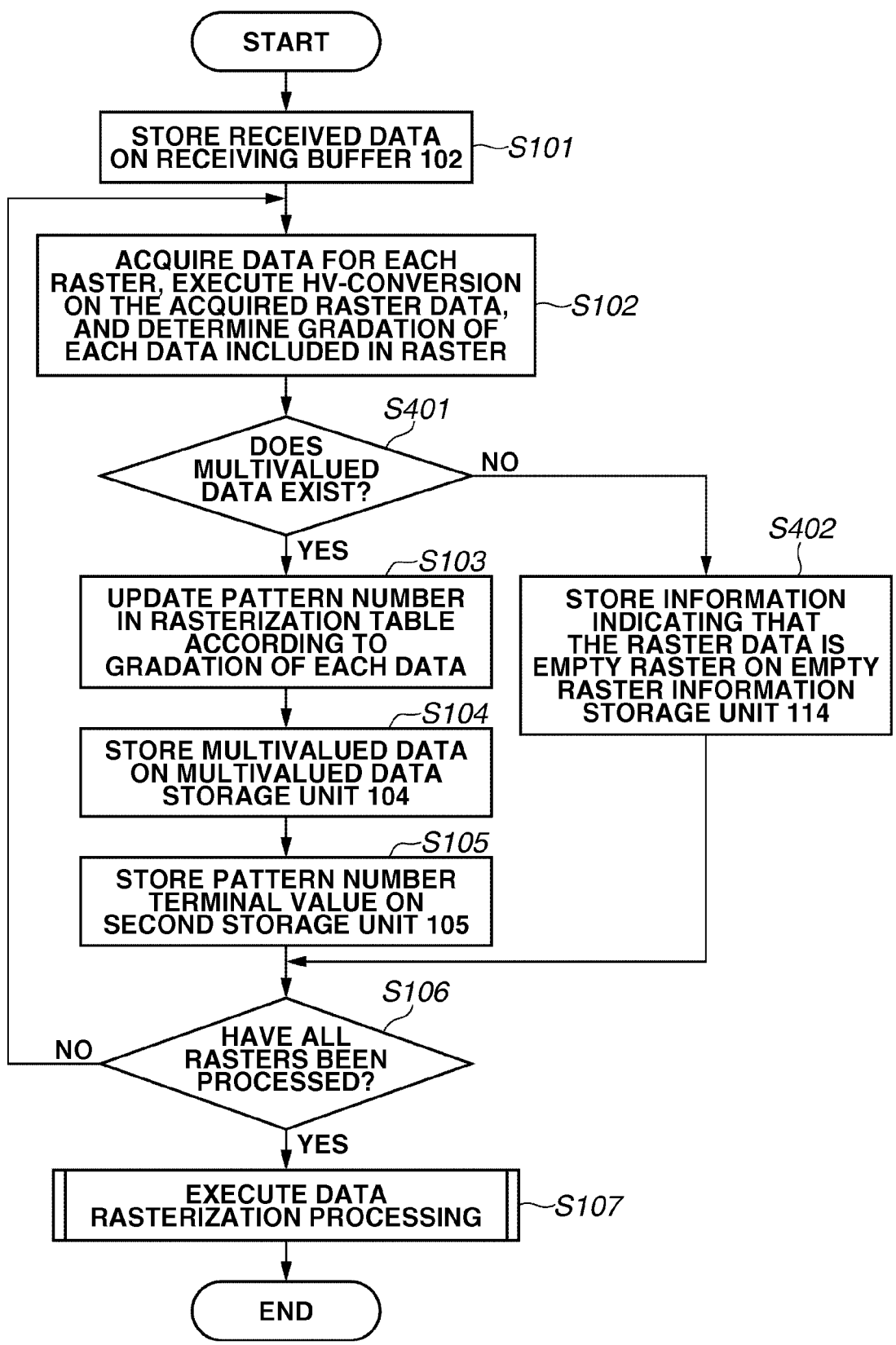
FIG. 8 is a flow chart illustrating an exemplary flow of processing executed by the recording apparatus according to the second exemplary embodiment of the present invention.

Now, an exemplary flow of processing executed by the recording apparatus 1 according to the present exemplary embodiment will be described in detail below with reference to FIG. 8. In the following description, processing executed after receiving data from the host apparatus 610 will be described. The processing executed by the recording apparatus 1 according to the present exemplary embodiment is basically similar to the processing illustrated in FIG. 4 in the above-described first exemplary embodiment. Accordingly, a difference from the first exemplary embodiment only will be described in detail.

After receiving data from the host apparatus 610, then in step S101, the recording apparatus 1 stores the received data on the receiving buffer 102. In step S102, the raster control unit 103 loads raster data for each raster from the receiving buffer 102. In addition, the raster control unit 103 executes HV conversion on the acquired raster data. In step S401, the raster control unit 103 determines the gradation of each multivalued data within the raster data.

If it is determined that multivalued data having a value other than "0" exists within the raster data (YES in step S401), then the processing advances to step S103. In step S103, the raster control unit 103 updates the pattern number corresponding to the rasterization table according to the gradation of each multivalued data as in the first exemplary embodiment. In step S104, the recording apparatus 1 stores the multivalued data on the multivalued data storage unit 104.

On the other hand, if it is determined that all the multivalued data included in each raster has a value of "0" (NO in step S401), then the processing advances to step S402. In step S402, the recording apparatus 1 stores information indicating that the raster data is an empty raster (empty raster information) on the empty raster information storage unit 114.

After that, similar to the first exemplary embodiment, in step S106, the recording apparatus 1 determines whether all the rasters have been completely processed. If it is determined that all the rasters have not been completely processed yet (NO in step S106), then the processing returns to step S102 and the processing in steps S102 through S105 and the processing in steps S401 and S402 are repeated. Steps S105 and S106 are the same as described above with reference to FIG. 4.

After executing the processing up to step S105, the processing advances to step S107. In step S107, the recording apparatus 1 executes the rasterization processing. Then, the processing ends.

Now, the data rasterization processing in step S107 illustrated in FIG. 8 according to the present exemplary embodiment will be described in detail below with reference to FIG. 9. The data rasterization processing according to the present exemplary embodiment is similar to that described above with reference to FIG. 5 in the first exemplary embodiment. Accordingly, a point in difference from the first exemplary embodiment will be primarily described in detail below.

When the data rasterization processing starts, in step S501, the recording apparatus 1 uses the empty raster determination unit 115 to refer to the data stored on the empty raster information storage unit 114. More specifically, in step S501, the empty raster determination unit 115 determines whether the raster to be processed is an empty raster. If it is determined that the raster data to be processed is an empty raster (YES in step S501), then the processing advances to step S209 and the recording apparatus 1 does not execute processing on the raster data. In this case, the processing advances to rasterization processing of a subsequent raster.

More specifically, in this case, in step S209, the recording apparatus 1 determines whether all the rasters have been completely processed as in the first exemplary embodiment. If it is determined that all the rasters have not been completely processed yet (NO in step S209), then the processing returns to step S201 and the processing in steps S201 through S208 are repeated. On the other hand, if it is determined that all the rasters have been completely processed (YES in step S209), then the processing ends.

Figure 9:
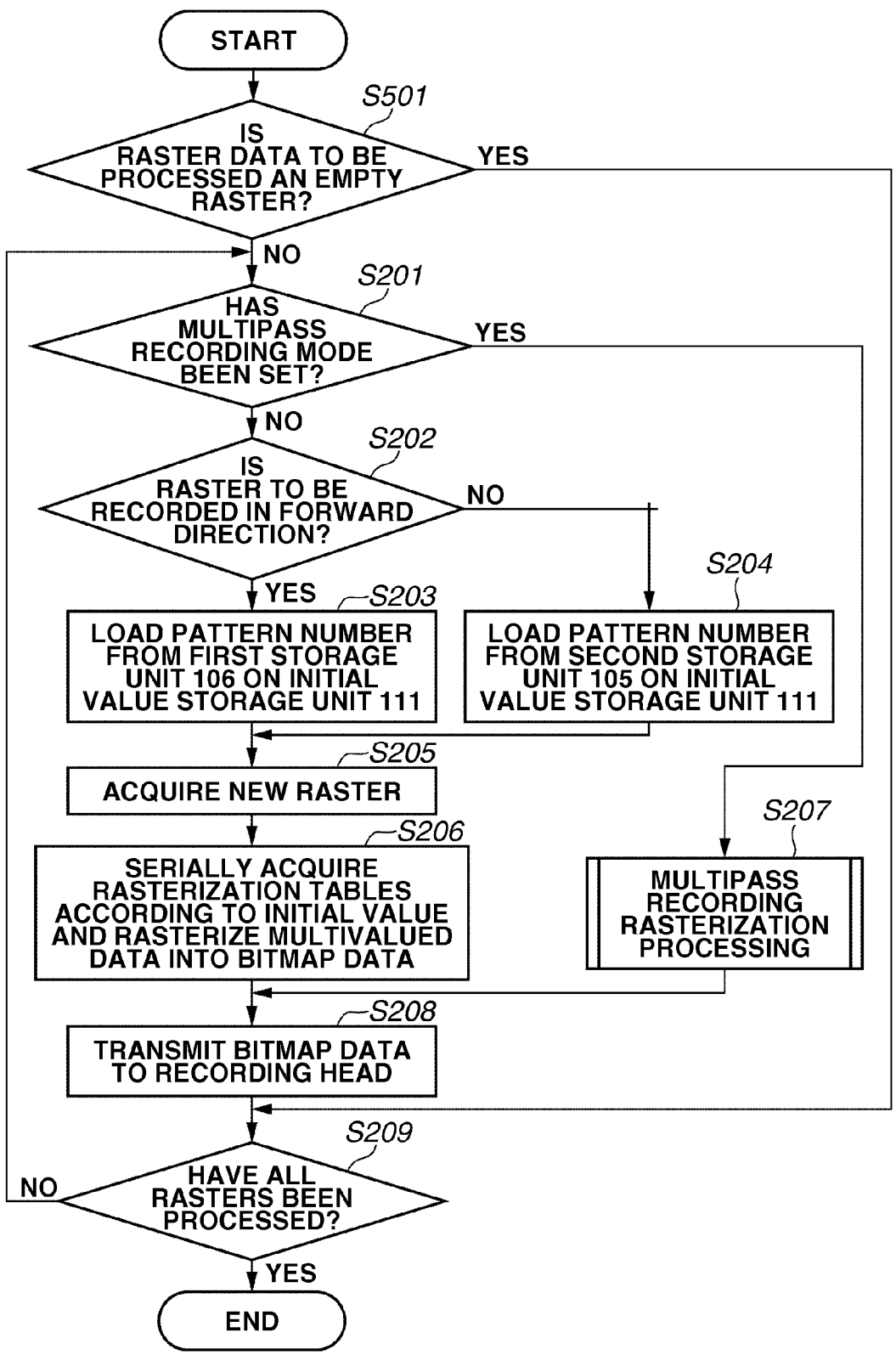
FIG. 9 is a flow chart illustrating an example of data rasterization processing, which is executed in step S107, according to the second exemplary embodiment of the present invention.

The multipass recording and rasterization processing in step S208 illustrated in FIG. 9 is similar to the processing in the first exemplary embodiment described above with reference to FIG. 6. Accordingly, the description thereof will not be repeated here.

As described above, according to the second exemplary embodiment having the above-described configuration, if an empty raster that does not include any multivalued data exists, the recording apparatus 1 does not store the pattern number corresponding to the rasterization table for the empty raster on the memory and sets empty raster information instead. Accordingly, the present exemplary embodiment can reduce the required capacity of the storage area. In addition, in the present exemplary embodiment, rasterization processing can be omitted for an empty raster. Accordingly, the present exemplary embodiment having the above-described configuration can reduce the data bus band.

Exemplary embodiments of the present invention are as described above. However, the present invention is not limited to the embodiments described above with reference to the attached drawings. More specifically, the present invention can be implemented by an appropriate modification thereof within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-182887 filed Aug. 5, 2009, which is hereby incorporated by reference herein in its entirety.

What is claimed is:

1. A recording apparatus configured to cause a recording head to scan in a reciprocating manner so as to execute recording, the recording apparatus comprising:
   a multivalued data storage unit configured to store raster data including a plurality of multivalued data indicating a gradation value per pixel;
   a pattern storage unit configured to store a plurality of dot patterns for at least a predetermined value among gradation values of the multivalued data;
   a generation unit configured, using in predetermined order the plurality of dot patterns stored in the pattern storage unit based on start information stored in a start information storage unit, to generate dot data for the predetermined value from multivalued data indicating the predetermined value among multivalued data included in the raster data;
   an information storage unit configured to store information for identifying a last dot pattern in a plurality of dot data generated for the predetermined value by the generation unit when the recording head is caused to scan in a reciprocating manner so as to execute printing; and
   an update unit configured to update the start information stored in the start information storage unit based on the identification information stored in the information storage unit,
   wherein, in a case where the recording head is caused to scan a predetermined area at least once in a reciprocating manner so as to execute printing, the update unit updates the start information stored in the start information storage unit when the recording head is caused to scan the predetermined area in a forward direction so as to execute printing, and then, the generation unit generates dot data for the predetermined gradation value based on the updated start information when the recording head is caused to scan the predetermined area in a backward direction so as to execute printing.

2. The recording apparatus according to claim 1, wherein the generation unit is configured to transfer binary data generated based on the dot pattern to the recording head.

3. The recording apparatus according to claim 1,
   wherein the start information storage unit stores, as the start information, first start information for identifying a first dot pattern for the predetermined gradation value in the raster data and second start information for identifying a last dot pattern in the raster data, and
   wherein the generation unit generates dot data based on the first start information when the recording head is caused to scan in the forward direction, and the generation unit generates dot data based on the second start information when the recording head is caused to scan in the backward direction.

4. The recording apparatus according to claim 3,
   wherein the first start information is set in advance, and
   wherein the second start information is updated by the update unit.

5. The recording apparatus according to claim 1, wherein the start information is stored for each gradation value.

6. The recording apparatus according to claim 1, wherein, when recording is executed on the predetermined area, the start information is updated in first scanning and the start information is not updated from second scanning.

7. The recording apparatus according to claim 1, further comprising:
   a determination unit configured to determine whether a raster is an empty raster in which all multivalued data of one raster are zero,
   wherein the update unit does not update the start information stored in the start information storage unit for the empty raster, and the generation unit does not generate dot data for the empty raster, based on the information stored in the second information storage unit.

8. A recording method of causing a recording head to scan in a reciprocating manner so as to execute printing, the method comprising:
   storing multivalued data composed of a plurality of multivalued data indicating a gradation value per pixel in a storage unit;
   acquiring a plurality of dot patterns for at least a predetermined value among gradation values of the multivalued data stored in a pattern storage unit;
   generating dot data for the predetermined value from multivalued data indicating the predetermined value among multivalued data included in the raster data,
   using in predetermined order the plurality of dot patterns stored in the pattern storage unit based on start information stored in a start information storage unit;
   storing, in an information storage unit, information for identifying a last dot pattern in a plurality of dot data generated for the predetermined value generated by the generation unit when the recording head is caused to scan in a reciprocating manner so as to execute printing; and
   updating initial value information stored in an initial value information storage unit based on the identification information stored in the information storage unit,
   wherein, in a case where the recording head is caused to scan a predetermined area at least once in a reciprocating manner so as to execute printing, the start information stored in the start information storage unit is updated when the recording head is caused to scan the predetermined area in a forward direction so as to execute printing, and then, dot data for the predetermined gradation value is generated based on the updated start information when the recording head is caused to scan the predetermined area in a backward direction so as to execute printing.

* * * * *